Patented May 15, 1945

2,376,223

UNITED STATES PATENT OFFICE 2,376,223

LEAD SULPHIDE CATALYSTS

Richard O. Bender, Ridley Park, Pa., assignor to Sinclair Refining Company, New York, N. Y., a corporation of Maine No Drawing. Application December 9, 1940, Serial No. 369,217

5 Claims. (Cl. 252—205)

This invention relates to improved catalysts and to the method of producing such catalysts. More particularly my invention relates to an improved lead sulphide catalyst of the general type useful in the treatment of light petroleum distillates containing undesirable sulphur compounds for the removal of such sulphur compounds therefrom, a process known as sweetening. The catalysts of my invention are especially useful in sweetening processes of the so-called "dry" type, such as those described in my application Serial No. 347,202, filed July 24, 1940, whereby light petroleum distillates containing undesirable sulphur compounds particularly mercaptans are sweetened by incorporating therein an amount of elemental sulphur approximating the amount required to convert the mercaptan content of the oil to disulphide and then passing the distillate containing elemental sulphur, in the presence of either dispersed oxygen or an alkaline compound in an amount sufficient to maintain the distillate in an alkaline state, or both, but in the absence of undispersed moisture, through a catalyst bed comprising preformed lead sulphide supported on an inert carrier.

Lead sulphide catalysts heretofore used in processes of this general type include catalysts prepared by saturating a porous carrier, such as fuller's earth, diatomaceous earth, and the like, with a concentrated aqueous solution of lead acetate and converting the lead acetate to lead sulphide by exposure to hydrogen sulphide gas. They also include lead sulphide catalysts prepared by admixing saw dust, previously wet with gasoline, with litharge (PbO) in such proportion that the litharge comprises about 40-50% by weight of the mixture and then passing through a bed of this mixture a charge of alkaline petroleum distillate containing a substantial excess of elemental sulphur until the litharge is converted to lead sulphide.

Catalysts prepared by the first of these methods are very inefficient due to the fact that they only contain from 12 to 13% lead sulphide. Moreover, in the type of process wherein an alkaline material is employed to maintain the distillate alkaline during the sweetening treatment, the alkali can cause progressive disintegration of the porous structure of the earth employed as the carrier, with the result that the bed of catalytic material may rapidly pack to such an extent that a resistance to the flow of liquid through the catalyst bed soon becomes so high as to render continued operation impracticable.

Catalysts comprising lead sulphide supported on a saw dust carrier when prepared as previously described are not disintegrated by the action of the alkaline compounds usually employed to maintain the distillate alkaline during the sweetening treatment at temperatures usually employed. However, they are very sensitive to moisture so that the presence of even a small amount of moisture in the material being treated eventually will cause packing of the catalyst bed to an extent requiring termination of the sweetening process in a period of time often much less than the usefully active life of the lead sulphide. This circumstance presents a serious handicap because the useful life of the catalyst bed could in many instances be substantially prolonged by dispersing moisture through the distillate being treated to dissolve and carry off accumulating water soluble salts.

The improved lead sulphide catalyst of the present invention contains from 50% to as high as 80% lead sulphide, has roughly twice the efficiency of the saw dust lead sulphide catalyst previously described, and does not pack in service over a prolonged period of time even in the presence of a significant amount of moisture. The catalyst of the present invention consists of lead sulphide attached to the exterior surfaces of sized particles of an inert carrier material of high strength and rigid structure, the particles being of irregular shape so as to present a large superficial area. The lead sulphide is attached to the surface of the carrier material by a binder in such a way as not to mask the outer lead sulphide surfaces. This requires that the layer of binder be thin so as to leave exposed the outer sulphide surfaces. Examples of suitable carrier materials are blast furnace slag and carborundum, crushed to produce ragged surfaces presenting a large superficial area and sized to pass through a six mesh screen but to be retained on an eighteen mesh screen. Glass beads may be employed as the carrier material if they are first sand blasted to increase the superficial area. The carrier material need not be of porous structure. It is only necessary that it be inert chemically and resistant to physical disintegration in the presence of moisture, alkaline materials and petroleum distillates, that it possess sufficient physical strength and rigidity to avoid crushing when incorporated in beds of substantial depth, that it be free from any substantial tendency to swell when exposed to moisture or to petroleum distillates, and that the outer surface of the particles be sufficiently irregular to present a large area. The binders which I have found particularly useful are the silicates of sodium, sodium metasilicate being the preferred binder.

In preparing the lead sulphide catalysts of my invention I prefer to wet the surface of the carrier material with an aqueous solution of the binder and then coat the wetted carrier with litharge (PbO). The litharge may then be converted to lead sulphide by contact with an alkaline solution of a petroleum distillate containing a substantial excess of elemental sulphur in accordance with the procedure heretofore employed in the preparation of saw dust lead sulphide catalysts.

The following example will serve to illustrate the preparation of a lead sulphide catalyst embodying my invention:

To 28 parts by weight of blast furnace slag, crushed and sized to pass a six mesh screen but to be retained on an eighteen mesh screen, were added 14 parts by weight of an aqueous solution of sodium metasilicate having a specific gravity of 1.286, this being a saturated solution at 80° F. Satisfactory results may be obtained with aqueous solutions of sodium metasilicates having a specific gravity of as high as 1.35 but efficient results are not obtained with solutions having a specific gravity materially below 1.286. To the mixture just described was added 58 parts of litharge. The sodium metasilicate solution and the litharge were applied to the slag by first immersing two-thirds of the slag in the metasilicate solution and permitting any excess of the silicate solution to drain and by then introducing the wetted slag into a concrete mixer with the other one-third of dry slag. After several minutes of mixing the entire 58 parts of litharge was quickly introduced into the concrete mixer. The mixing was continued for a short period and the resultant product then was removed from the mixer. As removed from the mixer the product consisted of small pellets uniformly coated with litharge. This product was then charged to a contact tower for conversion of the litharge to lead sulphide in the manner above described. Quick addition of the litharge is necessary to prevent coagulation and coalescence of the particles.

The following example will serve to illustrate a sweetening operation employing the improved catalyst of my invention. A catalyst bed consisting of 80.2 cubic feet of the catalyst prepared as above described was placed on a perforated support in a contact tower. A very sour polymer gasoline in which a small amount of elemental sulphur had been incorporated was supplied to the upper end of the tower and passed downwardly through this catalyst bed at a rate of 57 barrels per hour. As the sour sulphur-containing gasoline entered the tower a solution of caustic soda of 25° Bé., a small amount of dispersed oxygen in the form of air and a small amount of moisture were dispersed through the gasoline by injecting impinging jets of steam, air and the alkali solution. The gasoline emerging from the bottom of the tower was doctor sweet and the process operating in this manner continued to sweeten the gasoline satisfactorily over a period of more than fifteen weeks.

The ability of the catalyst bed to resist packing is shown by the fact that after sixteen weeks of continuous operation in the manner just described, the pressure drop across the tower was only 15 pounds. During this period 145,000 barrels of sour gasoline were passed through the catalyst bed and satisfactorily sweetened. The amount of sulphur used in this operation averaged 60.5 pounds per 1000 barrels of gasoline treated. Caustic soda was supplied at an average rate of 44.3 pounds per 1000 barrels of gasoline treated while dispersed moisture, introduced in the form of a steam jet, was supplied at an average rate of 200 pounds per 1000 barrels of gasoline treated. Dispersed oxygen in the form of air was supplied at an average rate of 16.5 pounds per 1000 barrels of gasoline treated.

In another similar operation, a more viscous household heating oil having a high content of refractory sulphur compounds was satisfactorily sweetened by passing the oil, with elemental sulphur, sodium hydroxide and dispersed oxygen incorporated therein in the manner previously described, through a catalyst bed containing 100 cubic feet of my improved lead sulphide catalyst at an average rate of 150 barrels per hour. The pressure drop across the catalyst bed with this somewhat more viscous oil varied between 15 and 20 pounds.

When the activity of a bed of this catalyst eventually has depreciated to an extent rendering continued operation undesirable, the catalyst may be reactivated by steaming the bed for several hours, then washing with water until it is substantially freed from water-soluble material and then drying.

While the foregoing description has been confined to a catalyst in which lead sulphide is the active component because of the economic advantages of this material, the sulphides of certain polyvalent metals are useful in sweetening processes of the type herein described and catalysts incorporating these sulphides as the active interior coating may be prepared by the process herein specifically described with respect to a lead sulphide catalyst. Mercuric sulphide, bismuth sulphide, arsenic sulphide, cupric sulphide, nickel sulphide and manganese sulphide are examples of other sulphides which possess useful catalytic activity in a sweetening process of the type herein described and which may be used in place of lead sulphide in my improved form of catalyst.

I claim:

1. A lead sulphide catalyst comprising a carrier consisting of crushed and sized particles of blast furnace slag, said particles of slag being covered with a thin layer of a sodium silicate binder and an exposed outer adherent coating of lead sulphide.

2. A lead sulphide catalyst comprising a carrier consisting of crushed and sized particles of carborundum, said particles of carborundum being covered with a thin layer of a sodium silicate binder and an exposed outer adherent coating of lead sulphide.

3. A method of manufacturing a lead sulphide catalyst comprising initially wetting sized particles of an inert carrier material with a sodium silicate binder, admixing this wetted carrier material in the absence of excess binder with an additional quantity of dry carrier material, quickly adding litharge to the wetted carrier while continuing the mixing and thereafter converting the litharge to lead sulphide.

4. A method of manufacturing a lead sulphide catalyst comprising initially wetting sized particles of an inert carrier material with an aqueous solution of sodium metasilicate having a specific gravity approximating 1.286–1.35, admixing this wetted carrier material in the absence of excess binder with an additional quantity of dry carrier material, quickly adding litharge to the wetted carrier while continuing the mixing and thereafter converting the litharge to lead sulphide.

5. A lead sulphide catalyst comprising a carrier consisting of sized particles of a material selected from the group consisting of blast furnace slag and carborundum, said particles being covered with a thin layer of sodium silicate binder and an exposed outer adherent coating of lead sulphide.

RICHARD O. BENDER.